Oct. 19, 1943.  E. J. ALMQUIST  2,331,882
THREAD COMPARATOR
Filed March 3, 1942
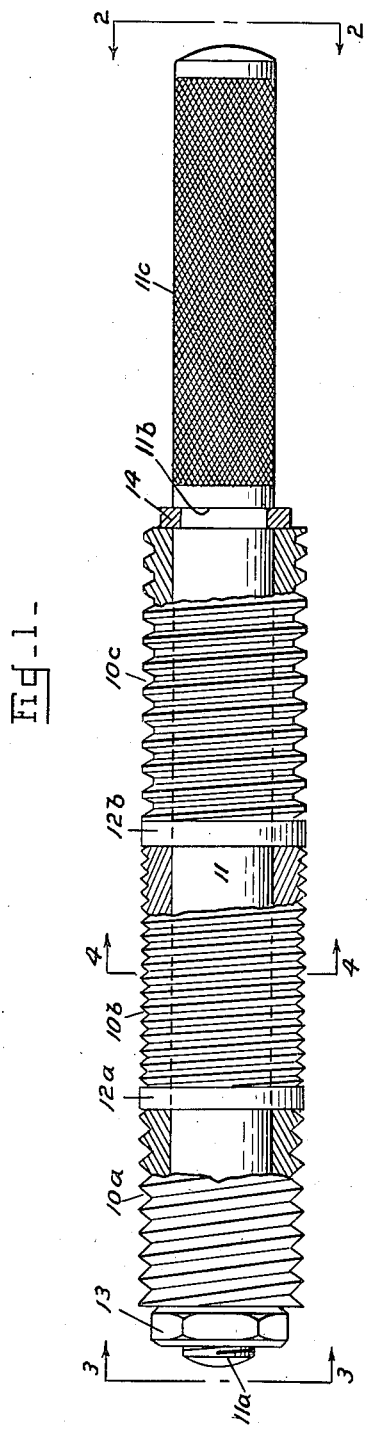
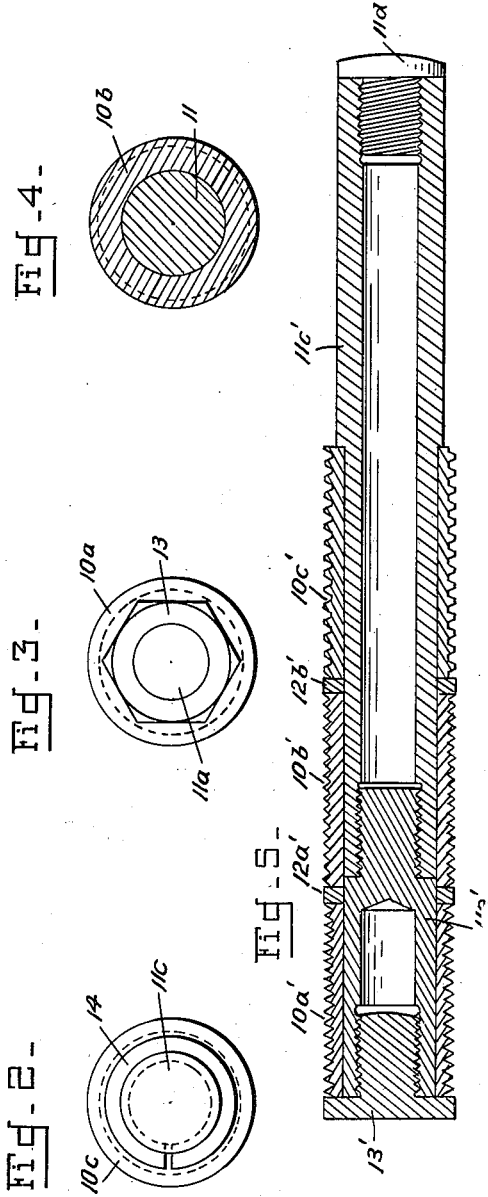
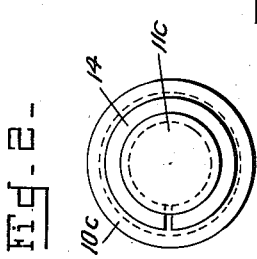
Inventor
Ephraim J. Almquist
By G. J. Kessenich & J H Church
Attorneys Patented Oct. 19, 1943

2,331,882

UNITED STATES PATENT OFFICE 2,331,882

THREAD COMPARATOR

Ephraim J. Almquist, Winona, Minn.

Application March 3, 1942, Serial No. 433,144

1 Claim. (Cl. 33—199)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a thread comparator.

An object of this invention is to provide a thread comparator having spaced circular threaded portions thereon, preferably of the same outside diameter, with each portion having a different type of screw thread thereon.

Another object of this invention is to provide a compact, handy and useful instrument for comparing some of the various types and surface conditions of threads which exist in the arts with standard types and surface conditions of those threads on the instrument.

Another object of this invention is to provide a thread finish comparator which may easily have inserted thereon duplicate replaceable samples.

Another object of this invention is to provide a thread finish comparator which serves to compare the minute surface irregularities of threaded fabricated parts.

Another object of this invention is to provide a compact, handy and useful instrument for comparing the appearance of fabricated screw threaded portions with the appearance of standard threaded portions on the instrument.

In particular, an object of this invention is to provide a compact, handy and useful instrument for comparing the finish on fabricated screw threaded portions with standard finishes on threaded portions on the instrument.

A finish comparator for smooth flat or smooth rounded surfaces is disclosed in my copending application Serial No. 433,143 filed March 3, 1942, which discloses a structure similar to that shown in the drawing in this application.

The instrument which is the subject of this invention is useful in the testing and inspection of finished screw threads, but it is useful also to the designer and fabricator of the article upon which the screw threads are placed. Besides being an instrument by means of which a particular type of screw thread may be ascertained, the instrument serves also as a qualitative standard for the particular type of screw thread under observation, i. e., the particular finish or surface of a screw threaded portion on a fabricated article may be compared with the finish or surface of the standard threaded portion on the instrument in inspection operation.

An instrument for comparing the surface conditions of flat and round articles is disclosed in my copending application.

The specific nature of the invention as well as other objects and advantages thereof will clearly appear from a description of a preferred embodiment as shown in the accompanying drawing in which:

Fig. 1 is a plan view of a thread comparator which embodies my invention and discloses fragmentary sections through the center of the comparator.

Fig. 2 is an end view taken substantially in the direction 2—2 on Fig. 1.

Fig. 3 is an end view taken substantially in the direction 3—3 on Fig. 1.

Fig. 4 is a section taken substantially on line 4—4 of Fig. 1.

Fig. 5 discloses a longitudinal section through a modified comparator.

In the particular embodiment of this invention disclosed in the drawing three standard threaded portions on cylinders or specimens 10a, 10b, 10c are shown concentrically mounted on the axially extending spindle 11, but it is understood that spindle 11 may be made longer or shorter so as to accommodate more or fewer of the standard threaded portions.

The threaded specimens or portions are spaced by means of spacers 12a, 12b which preferably have an outside diameter equal to the outside diameter of the threaded specimens or portions and an inside diameter equal to the outside diameter of the spindle.

Spindle 11 has a reduced threaded portion 11a for a jam nut 13. The threaded portions or specimens 10a, 10b, 10c and spacers 12a, 12b are held on the spindle between the jam nut 13 and split resilient ring 14 which abuts against spindle shoulder 11b and tends to keep the threaded portions 10a, 10b, 10c and spacers 12a, 12b in contact with one another by exerting a lock washer action on jam nut 13. Shoulder 11b may be considered to be a stop. Thus provision is made to prevent the jam nut from becoming loose and also to keep the threaded portions in contact with one another when the instrument is subjected to large temperature variations.

The comparator may be assembled without the spring washer 14, if the spindle is turned down sufficiently to leave a shoulder for the specimen 10c to abut against.

With screw threaded portions having approximately a 7/8" to 1¼" outside diameter, a suitable handy instrument may be made in which each threaded portion or specimen is approximately one and one-quarter inches in length, but the exact length of the specimens may be conveniently made shorter or longer than one and one-quarter inches.

In an instrument which may be made in accordance with this invention the threaded portions 10a, 10b, 10c may have the following types of screw threaded portions thereon: 10a, outside diameter ⅞", 9 threads per inch and of the NC or National coarse type; 10b, outside diameter ⅞", 14 threads per inch and of the NF or National fine type; 10c, outside diameter ⅞", 8 threads per inch and of the NA or Navy-Army type.

One end 11c of the spindle 11 has rolled knurling thereon to facilitate manual handling of the instrument.

The threaded portions 10a, 10b, 10c may have various types of finish and surface irregularities thereon and may be of such a standard that screw threads which have a coarser finish or have irregularities thereon will be rejected by an inspector when he compares the fabricated screw thread under inspection with the corresponding standard screw threaded portion on the instrument.

It is obvious that the threaded portions, specimens or cylinders 10a, 10b, 10c may be easily removed by unscrewing the jam nut 13; other similar specimens or cylinders may be substituted for one or all of the specimens or cylinders removed. This last feature is particularly advantageous since then specimens or cylinders which are cut from the same piece of machined stock may be placed on the spindle of one or more of the instruments located at different places in a manufacturing plant or at different localities. Since one large piece of machined stock may be cut into a plurality of small specimens having the same finish, successive specimens of the same finish may be easily inserted on the instrument spindle periodically as the finish on the particular specimen on the instrument becomes tarnished or polished in use, whereby the standard of finish on the comparator remains practically constant over a period of time. If the specimens could not be replaced on the comparator spindle easily, it would be necessary to immerse the comparator in oil to prevent tarnishing of the specimen surface and in that case the specimens would become polished due to the action of the inspector or user when he wipes the oil from the specimens on the comparator.

An alternate design is shown in Fig. 5. The spindle 11' is made tubular for weight reduction purposes. The tubular end or handle of spindle 11c' is provided with an inside thread and a threaded retaining plug 11d' with a head having at least one flat surface (not shown) for facilitating assembly and disassembly with a wrench or pliers.

The front end of the tubular spindle 11c' has an inner threaded portion for the reception of one end of an extension 11e' whereby the effective length of the spindle 11' may be varied. The opposite end of the extension 11e" is tubular and has an inner screw thread for the reception of screw threaded retaining plug 13'.

As also mentioned in my above mentioned co-pending application the material of the surface finish specimens should preferably be of the same material as the work to be compared and machined by the same method and with the same kind of tools with which the work to be compared is processed. However, experience has proven that the roughness of a surface can be satisfactorily compared when the finish specimens on the comparator are of dissimilar materials; i. e. comparators of stainless or corrosion resistant steel can be satisfactorily used for comparing surface roughnesses of parts made from other kinds of steel, iron, brass, bronze, aluminum, etc. This may be done principally by the "feel" method, and in most cases by the visual method as well, even though the work is done in a different manner and with different tools than were used for the surfaces of the comparators.

I claim:

A thread comparator comprising a spindle having a bearing portion of uniform diameter, a part of said spindle forming a handle, a threaded cylinder removably mounted on the bearing portion of the spindle, resilient means in abutting relation to the handled portion for limiting the movement of the cylinder with respect to the handle, and a jam-nut on the end of the spindle and holding said cylinder thereon.

EPHRAIM J. ALMQUIST.